United States Patent [19]
Skoog et al.

[11] Patent Number: 5,269,674
[45] Date of Patent: Dec. 14, 1993

[54] DOUGH DIVIDER

[75] Inventors: Torsten Skoog; Leif Nilsson, both of Glimåkra, Sweden

[73] Assignee: Glimek AB, Glim-522 kra, Sweden

[21] Appl. No.: 911,324

[22] Filed: Jul. 10, 1992

[30] Foreign Application Priority Data

Dec. 7, 1991 [SE] Sweden .................. 9102172-5

[51] Int. Cl.⁵ .................................................. A21C 5/00
[52] U.S. Cl. .................................... 425/238; 222/282; 222/309
[58] Field of Search ................... 222/251, 282, 309; 425/238, 239, 240, 241, 448, 449

[56] References Cited

U.S. PATENT DOCUMENTS

| | | | |
|---|---|---|---|
| 871,650 | 11/1907 | Streich | 425/239 |
| 1,559,805 | 1/1925 | Streich | 425/238 |
| 1,757,099 | 5/1930 | Streich | 425/238 |
| 2,104,432 | 1/1938 | Marasso | 425/238 |
| 2,408,602 | 10/1946 | Bowker | 425/238 |
| 2,408,679 | 10/1946 | Palmer | 425/238 |
| 2,609,765 | 9/1952 | Pointon | 425/238 |
| 2,638,066 | 5/1953 | De Ridder | 425/238 |

FOREIGN PATENT DOCUMENTS

| | | | |
|---|---|---|---|
| 1234637 | 2/1967 | Fed. Rep. of Germany | 425/239 |
| 1240781 | 5/1967 | Fed. Rep. of Germany | 425/238 |
| 2950127 | 6/1981 | Fed. Rep. of Germany | 425/238 |
| 74747 | 1/1961 | France | 425/238 |
| 61-181328 | 8/1986 | Japan | 425/238 |
| 435166 | 9/1935 | United Kingdom | 425/239 |

*Primary Examiner*—Scott Bushey
*Attorney, Agent, or Firm*—Merchant, Gould, Smith, Edell, Welter & Schmidt

[57] ABSTRACT

A dough divider having a dough chamber and, reciprocating therein, a dough feeding plunger for feeding a batch of dough to a measuring chamber whose volume is adjustable for producing pieces of dough of any desired volume and weight. For the driving of the dough feeding plunger, this is connected to a driving motor through the intermediary of a spring device. To avoid undesired working of the dough in the dough chamber during feeding of the dough to the measuring chamber, the spring device in the dough divider according to the invention is double-acting, and the dough divider is provided with an adjustable abutment which stops the dough feeding plunger as it moves away from the measuring chamber, such that the effective volume of the dough chamber may be adapted to the measuring chamber volume as set. Since the spring device is double-acting, relative motions between the driving motor and the dough feeding plunger can be absorbed by the spring device in both directions of travel of the plunger.

3 Claims, 4 Drawing Sheets

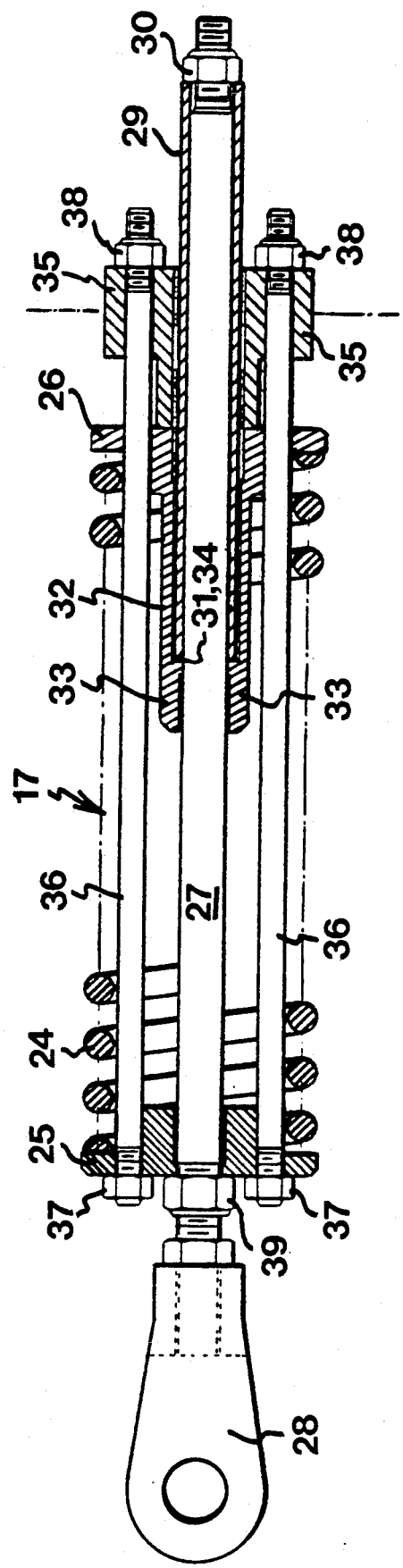

DOUGH DIVIDER

The present invention relates to a dough divider for dividing a batch of dough into a number of dough pieces which should have essentially the same weight and volume.

BACKGROUND OF THE INVENTION

A prior art dough divider of this type is disclosed in SE-B-323,341. This dough divider comprises a dough hopper at the lower end of which there is provided a dough chamber which, as the dough is being divided, is kept apart from the rest of the hopper by means of a reciprocating dough knife. The dough chamber contains a dough feeding plunger which on its forward stroke forces the dough from the dough chamber into a measuring chamber. The volume of the measuring chamber is controlled by a counter-plunger which also serves as dough discharging means. When the measuring chamber has been filled, it is moved relative to the dough chamber such that the measured dough piece(s) can be pressed by means of the counter-plunger out of the measuring chamber to a receiving station in the form of a conveyor belt. In the dough divider according to SE-B-323,341, the measuring chamber is divided into a number of sub-chambers, thereby producing a number of dough pieces during each cycle of operation. In other prior art, similar dough dividers there is but one measuring chamber.

U.S. Pat. No. 871,650 (F. Streich, Nov. 19, 1907) discloses a further example of a similar, prior art type of dough divider. This comprises dough feeding rollers at the lower end of the hopper for feeding the dough down to a dough chamber. The dough chamber is not separated from the hopper during the forward movement of the dough feeding plunger to press the dough into the measuring chamber(s). A compression spring is inserted between the dough feeding plunger and an operating lever which is pivotable back and forth, and there is a lost motion connection between the plunger and the operating lever. The operating lever always performs a full rearward stroke during each cycle of operation, i.e. it always moves as far away from the measuring chamber(s) as is possible during each cycle. If the dough should stop the dough feeding plunger on its forward stroke, i.e. in the direction of the measuring chamber(s), the compression spring will, however, permit a relative motion between the operating lever and the plunger by being compressed as much as the lost motion mechanism allows. By this arrangement and by the dough divider according to this patent specification having a permanently open communication between the hopper and the dough chamber, the dough will be subjected to powerful working during the entire cycle of operation, also in case the forward movement of the dough feeding plunger in the direction of the measuring chamber(s) occurs through the intermediary of the spring between the operating lever and the plunger, the spring being compressed as the operating lever moves towards its right extreme position, when the dough has completely filled the measuring chamber and therefore stops the movement of the plunger. The lost motion mechanism allows this relative motion between the operating lever and the plunger. The working of the dough in the dough chamber in this prior art dough divider leads to overworking which in most cases results in deterioration of the baking properties of the dough and variations in weight and volume of the measured dough pieces.

In the dough divider according to U.S. Pat. No. 871,650, the compression spring between the dough feeding plunger and the operating lever which is pivotable back and forth is merely single-acting in that it is compressed only when the dough stops the forward movement of the plunger in the direction of the measuring chamber(s). This means that in this known dough divider, maximum filling of the dough chamber always takes place, which further increases the tendency to overworking of the dough in the dough chamber, since this always contains more dough than the measuring chamber(s) will hold, if the movement of the dough feeding plunger is stopped on the forward stroke thereof.

A similar dough divider is disclosed in U.S. Pat. No. 2,408,679, in which there is also a lost motion connection in the train between the driving motor and the dough feeding plunger.

U.S. Pat. No. 1,757,099 (F. Streich, May 6, 1930) discloses a dough divider whose dough chamber is separated from the hopper during the movement of the dough feeding plunger in the direction of the measuring chamber(s). In this design, the dough is subjected to powerful working in the dough chamber, especially when measuring small pieces of dough. This also applies to the dough divider according to U.S. Pat. No. 1,559,805 (F. Streich, Nov. 3, 1925).

These and similar prior art dough dividers have been successfully used in bakeries, although they have in some cases produced dough pieces, the weight and volume of which have varied from piece to piece. In certain types of dough, this variation has been more pronounced than in other types.

SUMMARY OF THE INVENTION

One object of the present invention is to provide a dough divider in which the accuracy to weight and volume of the divided dough pieces is significantly improved as compared to prior art dough dividers. A further object of the invention is to provide a double-acting spring device to be mounted in the train between a dough feeding plunger and the driving motor thereof, thereby improving the accuracy to weight and volume of the dough pieces which are divided in a dough divider.

The invention is based on the knowledge that the insufficient accuracy to weight and volume is due to the fact that the above-mentioned, prior art dough dividers cause overworking of the dough in the dough chamber as the dough is being forced into the measuring chamber(s). Because of the design of the prior art dough dividers, the dough feeding plunger always effects a full rearward stroke such that the dough chamber will always contain too much dough compared to the amount of dough that the measuring chamber(s) will hold. Although the prior art dough dividers include a compression spring device which permits displacement of the driving motor also after the forward stroke of the dough feeding plunger has been stopped by the dough in the dough chamber, when the measuring chamber has been filled, the compression of the dough causes undesired working which probably is the reason for the above-mentioned disadvantage of the prior art dough dividers.

On the basis of this knowledge, it is suggested according to the present invention that the dough divider be provided with stop means, by means of which the rearward movement of the dough feeding plunger away from the measuring chamber(s) can be stopped in an optional position before the rearward stroke has been completed, such that the effective volume of the dough chamber can be adapted to the measuring chamber volume as set, whereby the working of the dough is kept at a minimum in the dough chamber.

To this end, the dough divider according to the invention is provided with a variable stop means for limiting the rearward movement of the dough feeding plunger away from the measuring chamber, and the spring device between the driving motor and the dough feeding plunger is double-acting so as to allow relative motion between the motor and the dough feeding plunger both on the forward and on the rearward stroke thereof.

Briefly, the invention thus relates to a dough divider comprising a dough chamber and, arranged therein, a reciprocating dough feeding plunger for feeding a batch of dough to a measuring chamber whose volume is adjustable so as to produce dough pieces of any desired volume and weight. The dough feeding plunger is driven by being connected to a driving motor through the intermediary of a spring device. To avoid any undesired working of the dough in the dough chamber during the feeding of the dough to the measuring chamber, the spring device in the dough divider according to the invention is double-acting, and the dough divider is provided with an adjustable abutment which stops the dough feeding plunger during its movement away from the measuring chamber, so that the effective volume of the dough chamber can be adapted to the measuring chamber volume as set. Since the spring device is double-acting, relative motions between the driving motor and the dough feeding plunger are absorbed by the spring device in both directions of movement of the plunger. Preferably the double-acting spring device is inserted between the rod of the dough feeding plunger and an operating lever driven by the driving motor, the variable abutment acting against the operating lever. Within the scope of the invention, the spring device may, however, also be inserted between the dough feeding plunger and its rod connected to the operating lever, the variable abutment acting against the dough feeding plunger.

BRIEF DESCRIPTION OF THE DRAWINGS

The invention will now be described in more detail with reference to the accompanying drawings which illustrate an embodiment of the invention.

FIG. 6 illustrates an embodiment of a spring device included in the dough divider according to the invention, in its neutral positon; and FIG. 7 illustrates two operating positions of the spring device in FIG. 6, i.e. a dough feeding position in FIG. 7A, and a plunger retracting position in FIG. 7B.

DESCRIPTION OF THE PREFERRED EMBODIMENT

Figure 1:
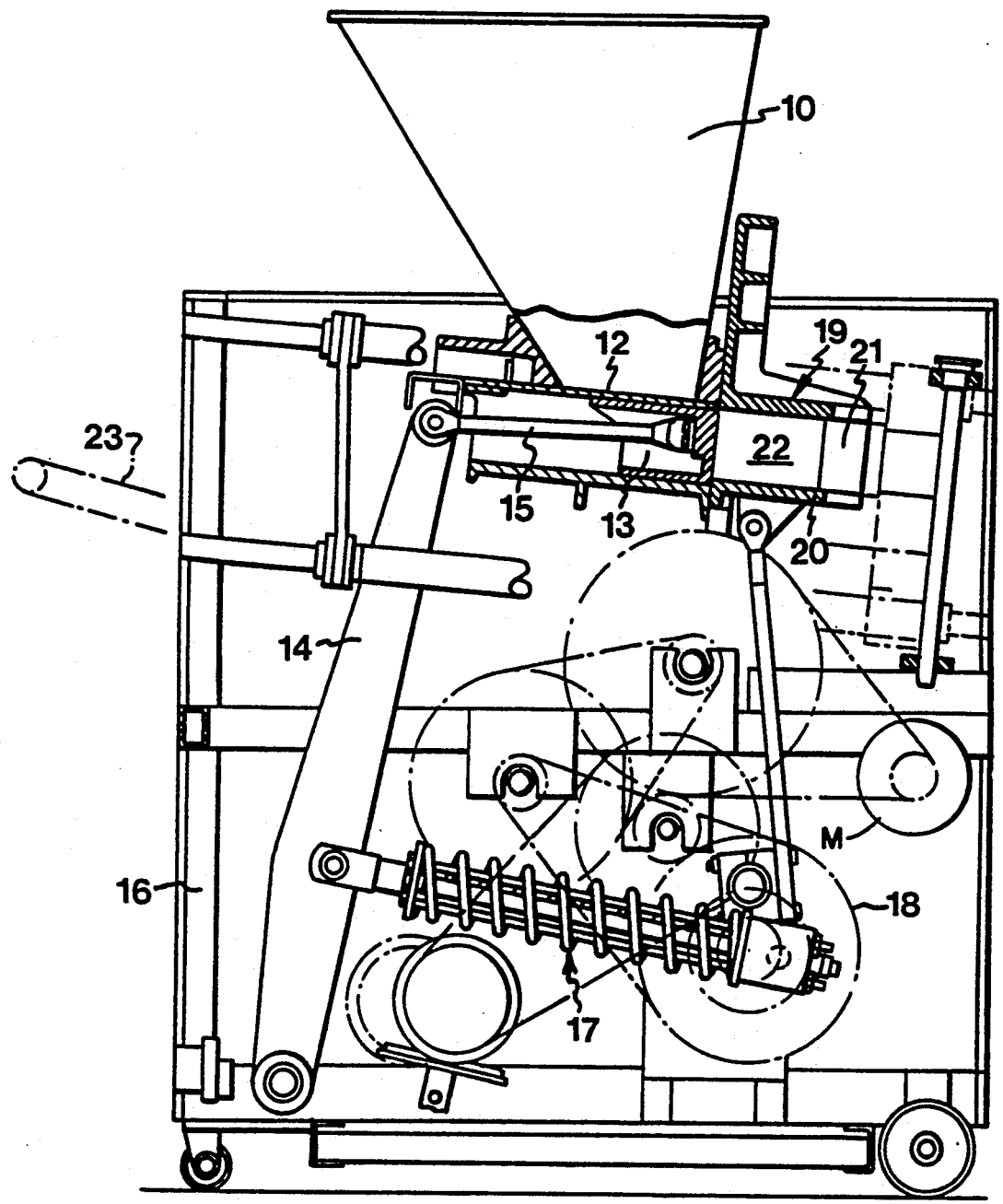
FIG. 1 is a schematic view, partly in cross-section, of an embodiment of a dough divider according to the invention.
Figure 2:
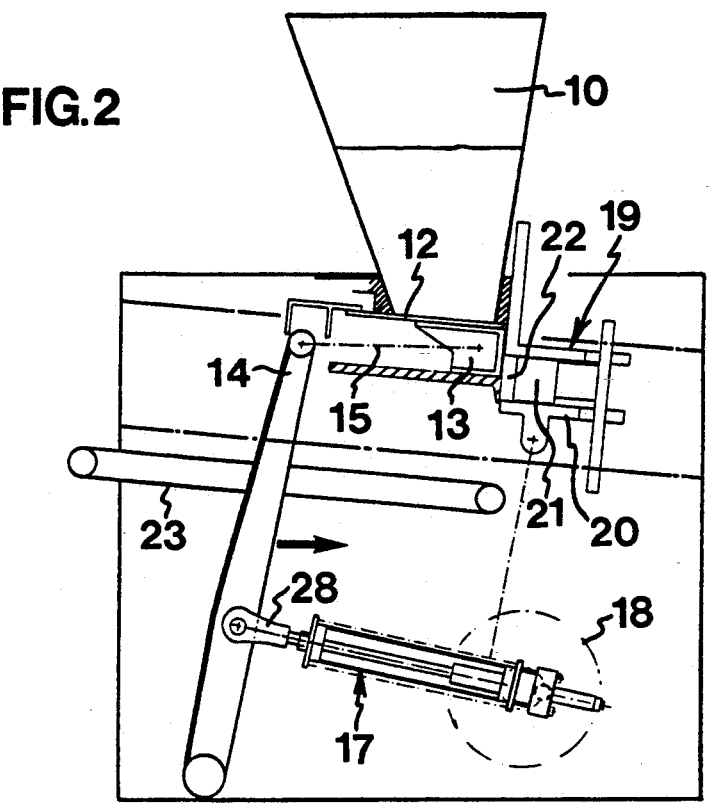
FIGS. 2-5 are schematic views of the dough divider in four different positions during a cycle of operation.
Figure 3:
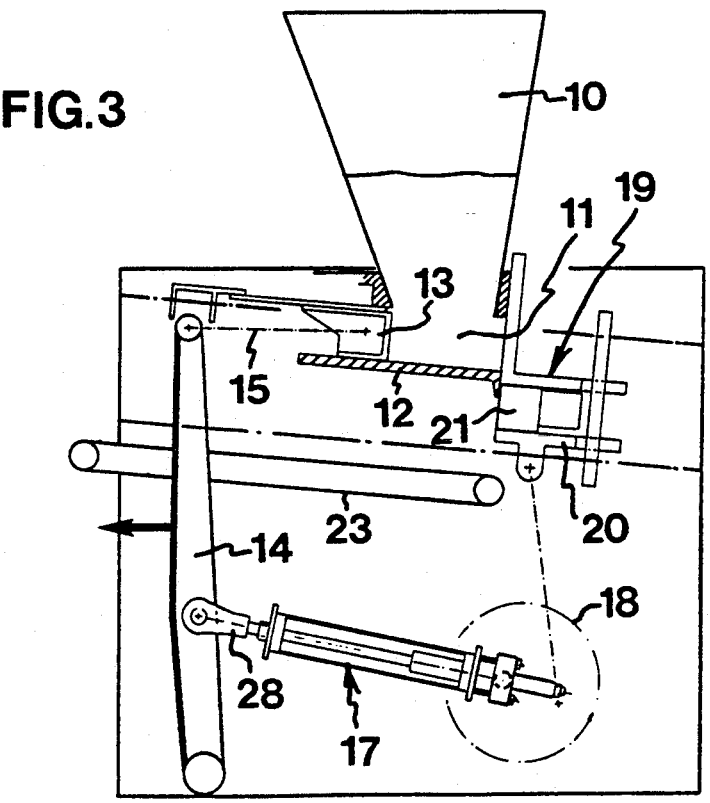
Figure 4:
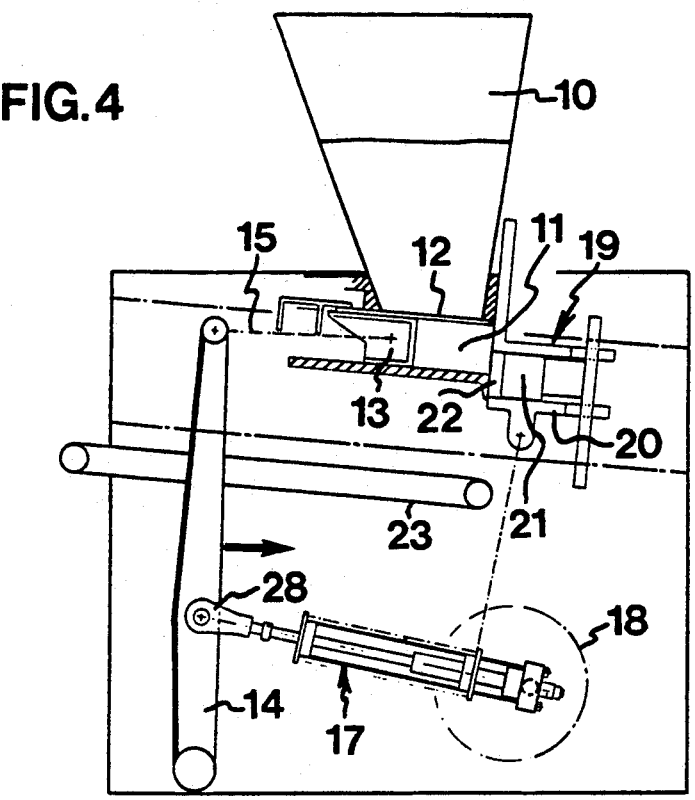
Figure 5:
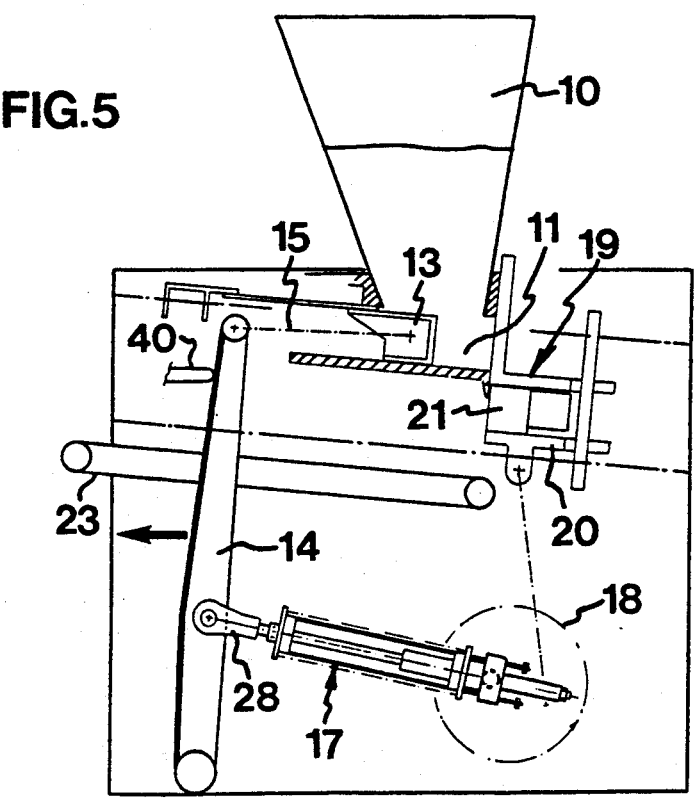

The dough divider in FIGS. 1-5 comprises a dough hopper 10 into which a prepared batch of dough is fed. At the lower end of the hopper there is a dough chamber 11. To separate the dough chamber from the rest of the hopper, there is provided a dough knife 12. This is movable between a retracted position as shown in FIGS. 3 and 5, and a closed position which is shown in FIGS. 1, 2 and 4 and in which the dough chamber 11 is separated from the rest of the hopper 10.

The dough divider further comprises a dough feeding plunger 13 reciprocating in the dough chamber 11. The plunger 13 is shown in its fully extended position in FIGS. 1 and 2, and in its fully retracted position in FIG. 3. In the embodiment illustrated, the plunger 13 is operated by means of a single-armed lever 14 and the rod 15 which is pivotably attached to the upper end of the lever.

The lever 14 is, at its lower end, pivotably connected to the frame 16 of the dough divider. In a suitable position between its ends, the lever 14 is connected to a spring device 17 which will be described in more detail below. The spring device is also connected to an eccentric device 18. The eccentric device is, in turn, operated by a motor m.

The dough divider further comprises a measuring device 19 having a measuring cylinder 20 and, movably arranged therein, a counter-piston 21. The measuring cylinder and the counter-piston define a measuring chamber 22. The counter-piston is movable by means of a drive mechanism (not shown) between a front discharge position (FIGS. 3 and 5) and a rear position (FIG. 1). Moreover, the rear position may be varied, thereby making it possible to vary the volume of the measuring chamber 22 according to the size of the dough pieces to be produced. FIG. 1 shows the fully retracted position of the counter-piston for producing large pieces of dough, and FIGS. 2-5 illustrate a different position for producing small pieces of dough.

The measuring device 19 is designed as a slide which can be displaced in lateral direction (in this case, in vertical direction) relative to the dough chamber 11. In FIG. 1, the measuring chamber 22 and the dough chamber 11 are aligned with one another. In FIGS. 2 and 4, the measuring chamber is slightly offset relative to the dough chamber, while maintaining the connection between the two chambers. FIGS. 3 and 5 illustrate the measuring device 19 in its discharge position in which it is displaced relative to the dough chamber 11 to such an extent that the produced dough piece can be forced out of the measuring chamber 22 by means of the counter-piston 21 to fall down onto a receiving station 23 which in this case is in the form of a conveyor belt. The conveyor belt 23 conveys the dough pieces to the subsequent processing machines in the bakery.

One embodiment of the spring device 17 included in the dough divider according to the invention is shown in more detail in FIGS. 6 and 7. The spring device comprises a compression spring 24 which is clamped between two spring stop means 25, 26. Both spring stop means 25, 26 are movable along a driving rod 27. One end of the driving rod 27 is fitted with a fork head 28 by means of which the spring device 17 is pivotably connected to the lever 14. A tube 29 is passed onto one end of the driving rod and held in position by means of a lock nut 30. The tube 29 encloses the driving rod 27 to about half the length thereof, the end of the tube thereby forming an abutment 31.

The spring stop means 26 is formed with a sleeve-shaped extension 32 which extends in the direction of the other spring stop means 25 and is displaceably supported on the tube 29. At its free end the extension 32 is designed such that its head 33 engages and is supported on the driving rod 27 and forms an abutment surface 34. The abutment surface 34 cooperates with the abutment 31 of the tube 29.

A runner 35 is displaceably supported on the tube 29 outside the spring stop means 26 and, in its normal position, pressed against this. The runner is pivotably connected to the driving motor or eccentric device 18 so as to be driven.

Finally, the spring device 17 also comprises two pull rods 36 extending through the spring stop means 25, 26 and the runner 35. The pull rods 36 are provided with a locking nut 37 outside the spring stop means 25 and, outside the runner 35, a locking nut 38 serving as an abutment. In the embodiment illustrated, the pull rods 36 are fixedly connected to the spring stop means 25 by means of the locking nuts 37, but they could be displaceable relative to the spring stop means 25. Instead of two pull rods, use can be made of more pull rods, or only one pull rod.

FIG. 6 shows the spring device 17 in its normal position in which the compression spring 24 has its maximum clamped length. In this position, the abutment surface 34 of the spring stop means 26 abuts the abutment 31 of the tube 29. Further, the spring stop means 25 abuts against a stop nut 39 on the driving rod 27. In this normal position, the spring device 17 can transfer forces not exceeding the pressing force which the spring 24 exerts upon the spring stop means 25, 26.

If the dough chamber 11 still contains dough, when the measuring chamber 22 has been filled with dough by moving the dough feeding plunger 13 to the right in FIG. 4, the compression spring 24 is compressed as illustrated in FIGS. 4 and 7A, i.e. the runner 35 is moved outwards and away from the spring stop means 26 and at the same time pulls along the pull rods 36 and, thus, also the spring stop means 25.

When the dough feeding plunger 13 has been returned to its starting position, as shown in FIG. 3, the runner 35 is pressed against the spring stop means 26 so that the spring 24, via the spring stop means 25 and the stop nut 39, presses the lever 14 counterclockwise, until reaching the position in FIG. 3. If the counterforces of the plunger 13 and the lever 14 do not exceed the compression force of the spring 24 in the normal position of the spring device, the spring device remains in the position shown in FIG. 6 during the entire retracting stroke.

As mentioned above, the invention is based on the knowledge that the undesired variations in weight and volume of the dough pieces produced probably depend on overworking of the dough, while filling the measuring chamber(s) 22 with dough. FIGS. 2–4 may be used to illustrate the function of a prior art dough divider and how such overworking of the dough occurs.

FIG. 2 illustrates an ideal position in which the dough feeding plunger 13 is moved as far to the right (with reference to the drawings) as is possible and in which all dough in the dough chamber 11 has been supplied to the measuring chamber 22. In such an ideal case, there is no overworking of the dough in the dough chamber.

FIG. 3 illustrates the dough feeding plunger 13 in its fully retracted position at the extreme left in the Figure. In prior art dough dividers, for example the one disclosed in SE-B-323,341 or U.S. Pat. No. 871,650, the dough feeding plunger 13 is always retracted to this position during each cycle of operation. If small pieces of dough are to be produced and the volume of the dough chamber thus exceeds the volume of the measuring chamber or the total volume of the measuring chambers, the dough feeding plunger will be stopped by the dough in the dough chamber 11, when the measuring chamber(s) 22 has been filled with dough, since the dough knife 12 confines the dough in the dough chamber. When the eccentric device or motor 18 tries to pivot the lever 14 further clockwise with reference to the drawings, the compression spring 24 will, as shown in FIG. 7A, be compressed in that the runner 24 is moved to the right away from the spring stop means 25 and, by the aid of the pull rods 36, pulls the spring stop means 25 away from its abutment 39. The compression of the spring increases the pressure exerted upon the dough which, as a result, is kneaded.

The dough divider according to the invention makes it possible to avoid such extra kneading of the dough. Therefore, the dough divider is provided with a variable abutment 40 to stop, in an optional position, the movement of the lever 14 and, thus, the dough feeding plunger 13 to the left during the filling phase in which the dough chamber is filled with further dough. The position of the abutment 40 thus determines the maximum volume of the dough chamber 11 during the cycle of operation of the dough divider. The ideal setting of the abutment 40 yields a dough chamber volume which only slightly exceeds the volume of the measuring chamber 22 or the total volume of the measuring chambers 22. Such a setting of the abutment 40 is illustrated in FIG. 5.

Since the spring device 17 in the dough divider according to the invention is double-acting, the abutment 40 can be used to limit the retracting movement of the dough feeding plunger 13, without ensuing damage to the train between the motor 18 and the plunger 13.

FIG. 7B shows how the spring 14 is compressed in that the runner 35 which is pivotably connected to the motor 18 is pressed against the spring stop means 26 and moved in the direction of the fork head 28 connected to the lever 14.

In prior art dough dividers, the equivalent of the spring device 17 permits relative motion between the motor 18 and the dough feeding plunger 13 merely during the feeding of dough to the measuring chamber(s) (FIGS. 7A and 4). In the dough divider according to the invention, the spring device 17 permits such relative motion also during the retraction of the dough feeding plunger 13 when this is stopped by the adjustable abutment 40.

In the embodiment illustrated, the dough divider is provided with a rotary motor for driving the different parts of the dough divider. However, the dough divider could also be driven by linear motors, e.g. pneumatic or hydraulic piston-and-cylinder assemblies. The important thing is, however, that the dough feeding plunger can be stopped in an optional position during its retracting movement, and that the spring device is double-acting and permits relative motion between the dough feeding plunger and the driving motor both on the forward and rearward stroke of the dough feeding plunger.

What we claim and desire to secure by Letters Patent is:

1. Dough divider for dividing a batch of dough into a number of dough pieces, having a dough hopper connected to a dough chamber which is temporarily separable from said hopper by means of a reciprocating dough knife and which contains a dough feeding plunger reciprocating between a rearward and forward movement for feeding dough from said dough chamber to a measuring chamber provided with a dough discharge device for discharging measured dough pieces to a receiving station, a driving motor being connected to the dough feeding plunger through a spring device, comprising a variable abutment for limiting the rearward movement of the dough feeding plunger away from the measuring chamber, and by the spring device between the driving motor and the dough feeding plunger being double-acting to allow relative motion between said motor and said dough feeding plunger both on the forward and rearward movement thereof.

2. The dough divider as claimed in claim 1, wherein the double-acting spring device is inserted between the driving motor and an operating lever which is connected to a rod attached to said dough feeding plunger.

3. The dough divider as claimed in claim 1 or 2, wherein the spring device comprises a compression spring clamped between a first and a second spring stop means which are movable towards and away from one another along a driving rod and which in a resting position each abut against an abutment on said driving rod, the spring device comprising at least one pull rod which is at least non-positively connected to the first spring stop means and along which on the one hand the second spring stop means and, on the other hand, a runner arranged outside said second spring stop means are reciprocal, and the driving motor and the dough feeding plunger are each connected to the driving rod and the runner, such that displacement of said runner towards said second spring stop means causes compression of said compression spring and displacement of said second spring stop means away from its abutment on the driving rod and towards said first spring stop means, and such that displacement of said runner away from said second spring stop means causes compression at the compression spring in that said first spring stop means is pulled away by said pull rod from its abutment on the driving rod and towards said second spring stop means.

* * * * *

UNITED STATES PATENT AND TRADEMARK OFFICE
CERTIFICATE OF CORRECTION

PATENT NO. : 5,269,674

DATED : December 14, 1993

INVENTOR(S) : Skoog, et al.

It is certified that error appears in the above-identified patent and that said Letters Patent is hereby corrected as shown below:

On title page,

In [73] after "Glimek AB," delete "Glim-522 kra" and insert --Glimakra--.

In [30] under "Foreign Application Priority Data" delete "Dec. 7, 1991" and insert --July 12, 1991--.

Signed and Sealed this

Sixth Day of September, 1994

Attest:

BRUCE LEHMAN

Attesting Officer        Commissioner of Patents and Trademarks